May 8, 1951

D. S. WATSON ET AL 2,552,022

EXPANDED SWEEP AND CALIBRATED MARKER
FOR CATHODE-RAY TUBE TRACE

Filed July 30, 1947

Inventors:
Daniel S. Watson
Cecil A. Laws
By Kenyon + Kenyon
their Attorneys.

Inventors:
Daniel S. Watson.
Cecil A. Laws.
By Kenyon & Kenyon
their Attorneys.

Patented May 8, 1951

2,552,022

UNITED STATES PATENT OFFICE 2,552,022

EXPANDED SWEEP AND CALIBRATED MARKER FOR CATHODE-RAY TUBE TRACE

Daniel Stewart Watson, Haslemere, and Cecil Alfred Laws, Boreham Wood, England, assignors to National Research Development Corporation, a corporation of Great Britain and Northern Ireland Application July 30, 1947, Serial No. 764,811
In Great Britain June 8, 1945

Section 1, Public Law 690, August 8, 1946
Patent expires June 8, 1965

21 Claims. (Cl. 315—26)

This invention is for improvements in or relating to object-locating and -detecting systems of the type in which electromagnetic or acoustic radiation is transmitted towards a distant object and signals reflected or reradiated from the object, hereinafter referred to as echoes, are reproduced on the luminescent screen of a cathode ray tube and the range of the object is determined by measuring the time-interval between the transmission and receipt of an echo-signal corresponding thereto. When the radiation is of radio-frequency such a system is known generally as a radar system.

In a copending application, Serial No. 764,810 filed July 30, 1947, by Richard Julius Pumphrey, Osbert Linn Ratsey and ourselves, apparatus is described which enables the time-base of the cathode ray tube to be calibrated electronically and the particular part of the time-base in the vicinity of a selected echo-trace to be expanded so as to permit more detailed examination of that trace with the aid of an auxiliary range-marker scale trace also expanded in the vicinity of the selected echo-trace. Such an arrangement, however, is intended mainly for use with systems which are locked to the main supply frequency and which operate consistently at a definite instant in each cycle. The present system is more flexible in application and the main object of the invention is to provide a rough measurement of the range of the selected echo-trace and a more accurate measuring arrangement to work in conjunction therewith.

The present invention provides an object-locating and -detecting system in which signals reflected or reradiated from objects illuminated by transmitted electromagnetic or acoustic radiation are displayed on a type A-scan cathode ray tube, wherein means are provided for increasing the speed of the cathode ray time-sweep for a short distance on either side of the peak of a selected echo-signal and means are also provided for generating a series of calibration markers synchronized with the said time-sweep and for reproducing on the screen of the tube only that calibration marker which is located within the expanded section of time-sweep.

In order that the invention may be readily understood an example thereof will now be described with reference to the accompanying drawings in which.

The principle underlying the invention may best be explained in the following manner. A type A-scan cathode ray tube is one in which signal amplitude and time are presented on rectangular co-ordinates and as the range of an object is proportional to time the luminescent screen indicates echo-signal amplitude plotted against object range. The total horizontal sweep of the cathode ray tube may represent a total range of from 0 to 50,000 yards so that even if the screen is fairly large the width of an echo-trace will represent several hundred yards. If the position of the echo-trace along the sweep is to be accurately measured means must be provided for accurately aligning some form of range-marker within the width of the echo-trace, and if the range-marker is to be movable, within the echo-trace, it must be very small. The size of the range-marker is, however, limited by the minimum size of spot which can be produced on the screen of the cathode ray tube and therefore the ranging is effected, according to the invention, by firstly actuating a fast time-base which can be introduced to accelerate a section of the time-sweep of the cathode ray tube, the effect being to expand the section of the sweep to which the fast time-base is applied. The position of the expanded section along the time-sweep can be moved by varying the setting of a ranging potential divider and when the position has been so moved that a selected echo-trace is expanded, the setting of the ranging potential divider, previously calibrated so as to indicate the range in yards along the time-sweep is noted. For a total sweep representing 50,000 yards the length of the expanded section may be 2,000 yards. A series of ranging spots spaced apart by 1,000 yards is then superimposed on the time-sweep and a phasing control is provided for moving the spots backwards and forwards over a distance of 1,000 yards. The phasing control is also calibrated in yards and the movement thereof necessary to bring the ranging-spot which lies within the expanded section into accurate alignment with the echo-trace is noted. Thus, the expanded section of trace provides a coarse measurement and the ranging spot provides an accurate measurement of the range of any selected echo-signal.

Figure 1:
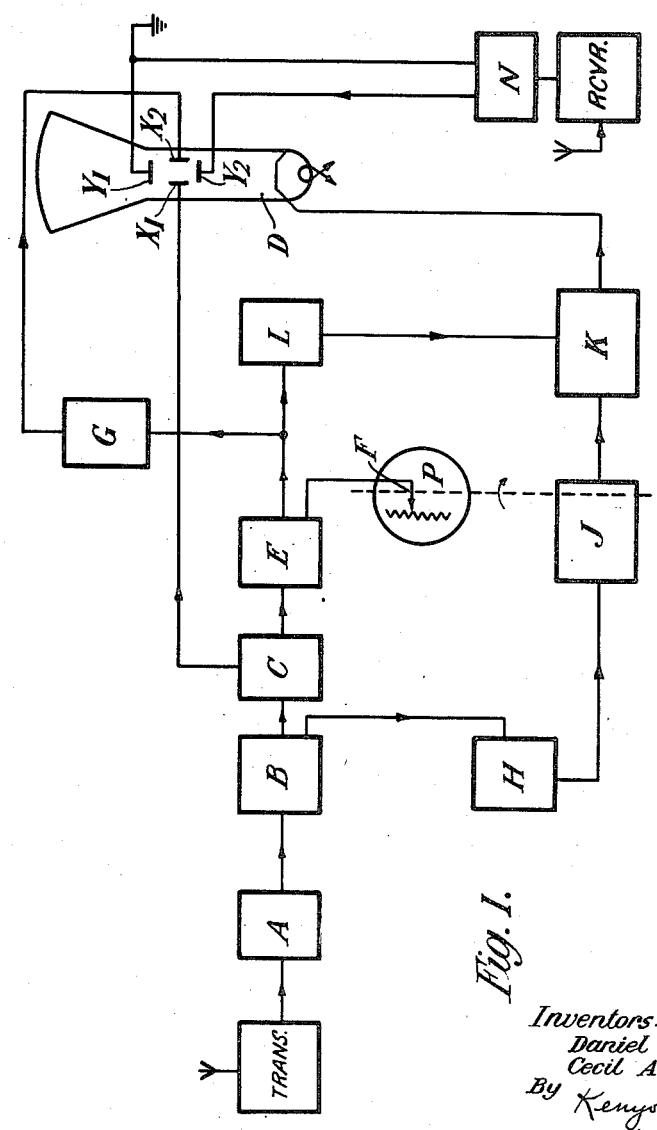
Figure 1 is a block diagram of apparatus for use in conjunction with a radar system.

The apparatus shown in block form in Figure 1 relates to a radar system in which a synchronizing pulse derived directly from the cathode current of the radar transmitter valve included in transmitter TRANS. and the start of which coincides with the beginning of the radar transmission is fed through an amplifier stage A to a cathode-coupled flip-flop circuit B which generates square positive and negative switching pulses. The positive pulse switches on a time-base circuit C producing a linear time-base voltage which is applied to the X1-plate of a cathode ray tube D and to one control grid of a variable time-delay valve E comprising two electrode systems. A second control grid of the valve E is maintained at a fixed potential determined by the position of the slider F of a ranging potential divider P. At some instant after the start of the time-base the potential of the first grid passes through the potential of the second grid and a voltage step is generated at each anode of the valve E. The negative step from one anode switches on a fast time-base circuit G connected to the X2-plate of the cathode ray tube D and thus produces an expanded section of scan. The circuit so far described constitutes the coarse ranging system. As the slider F of the ranging potential divider P is moved, the delay between the synchronizing pulse and the start of the expanded section alters.

At the same time as the time-base circuit C is started off a negative switching pulse derived from the flip-flop circuit B is fed to a ranging oscillator H where it triggers a pulsed oscillator circuit generating a train of sine waves beginning exactly at the positive-going cross-over point in the cycle. The train is of the same length as the ranging time-base and the oscillators are maintained at a constant amplitude by a feed-back valve which is also switched on by a pulse derived from the flip-flop circuit B. The oscillatory output is fed via a cathode follower and a transformer to a ranging unit J where the signal is divided by a quadrature network into two components differing in phase by 90° which feed the field coils of a variocoupler used as a phase-shifting transformer. The output from the variocoupler rotatable coil is still a train of sine waves but the phase of the output relative to that of the input to the variocoupler depends on the angular position of the rotatable coil, and as the coil is turned the phase varies continuously from 0 to 360°.

The output from the ranging unit J passes to a ranging-spot-, bright-spot-, or dark-spot generator K where the sine wave input is squared and converted into a series of very short negative pips, there being one pip per cycle, which coincides with the negative-going cross-over points of the sine waves derived from the variocoupler rotatable coil. As the variocoupler rotatable coil is turned the pips are made to move smoothly backwards and forwards and if the echo-trace is made to coincide with one of them the range of that trace can be measured by counting the number of pips and the fraction of the interval between pips which have elapsed between the synchronizing pulse and the reception of the signal. In order to do this easily it is necessary to select one pip for reference and to suppress all of the remaining pips since if they were all permitted to appear on the screen of the cathode ray tube as range-markers the operator would have difficulty in distinguishing the particular pip which he should observe. The coarse ranging system described above is, therefore, employed as a "gate" which selects one pip and the ranging potential divider counts the number of complete pip-intervals whilst the variocoupler enables the extra fraction of a complete pip-interval to be measured.

The negative step from the variable time-delay valve E is applied to a gate-pulse generator L whose output is fed to the ranging-spot generator K so that only the one pip which occurs during the period of the gate appears in the anode output of the generator K. The single short negative pulse thus produced is applied to the cathode of the cathode ray tube D causing the trace thereon to be brightened at one point. Alternatively, the pulse derived from generator K may be applied to the grid of the cathode ray tube causing a dark spot to appear on the trace. There is thus produced on the A-scan tube D an expanded section having a single bright or dark spot thereon which is the range-spot. The video signal consisting of the radar signals received from the aerial via receiver RCVR. after amplification and rectification in an amplifier N is applied in known manner to the Y2-plate of the cathode ray tube D so that it appears as a vertical deflection of the trace. Measurement of range is then effected by making the direct echo-trace and the range-spot coincide and noting the corresponding position of the ranging potential divider and the variocoupler which, for convenience, are preferably mechanically coupled together.

The circuits will now be described in more detail with reference to Figure 2 of the drawings. A synchronizing pulse derived from the cathode current of a magnetron oscillator in the radar transmitter is fed to the cathode of a valve V1 through a coupling condenser C1. The output at the anode of valve V1 is fed as a triggering pulse through a coupling condenser C2 to the grid of one triode $b$ of a double-triode valve V2 connected as a conventional cathode-coupled flip-flop circuit. The negative pulse from the anode of the triode $b$ of the valve V2 is used to trigger a ranging oscillator, hereinafter described, but since the pulse amplitude of the anode itself is excessive the output is taken from a tap of the anode load comprising resistances R1, R2 and a small condenser C3 is connected across the lower resistance R2 of the load in order to preserve the sharpness of the edge of the pulse which would otherwise be spoilt by the stray capacities in the leads. The positive pulse from the anode of triode $a$ of the valve V2 is fed through a condenser C4 to the suppressor grid of a time-base valve V4. A proportion of the output from the anode of triode $a$ is taken from a tap on an anode load comprising resistances R3, R4 for a purpose hereinafter described. The time-base valve V4 generates a time-base which is linear to a fairly high degree of accuracy due to the connection of a condenser C7 between its anode and grid. The time-base is started by the positive switching-pulse derived from the anode of triode $a$ of valve V2 and fed to the suppressor grid of valve V4, which is normally cut off. The suppressor grid leak R5 is connected to a negative source of voltage and has a clamping diode valve V3 connected across it in known manner. The biassing voltage for the valve V4 is therefore augmented by the permanent charge on condenser C4. The anode of valve V4 is connected through output coupling-condensers C5 and C6, which are joined in parallel, to the X1-plate of the cathode ray tube D so that the steady fall in anode potential produces a linear time-base sweep. The anode of valve V4 is also connected to a clamping diode valve V5 and to the grid of triode $b$ of a double-triode valve V6 acting as a variable time-delay valve. The function of the clamping diode valve V5 is to fix the starting voltage of the time-base valve V4 and so to eliminate jitter due to variations in the starting point of the time-base. At the beginning of each sweep, valve V5 is conducting, but as soon as the voltage of the anode of valve V4 begins to fall, valve V5 ceases to conduct and remains non-conducting for the remainder of the sweep. When the end of the suppressor switching-pulse fed to valve V4 is reached, the anode current thereof is again cut off so that condenser C7 is recharged through an anode load resistance R6 and the anode voltage rises exponentially towards the supply voltage, the potential on the lower plate of condenser C7 remaining approximately zero. As soon, however, as the potential on the anodes of valves V4 and V5 reaches the same value as that on the cathode of the valve V5, V5 again begins to conduct and the anode potential of valve V4 is prevented from rising any further. The slow operation of the exponential recovery is thus eliminated and the starting point of the next sweep is clamped at a constant level. Although this clamping action reduces the total length of sweep available there is still more than enough to cover any range likely to be desired. It is obvious that the length of sweep can be varied as desired by suitable choice of the values of resistor R6 and condenser C7 in the known manner.

As stated above, the sweep voltage is applied to the grid of triode $b$ of valve V6. During the quiescent period this grid is at the same potential as the anode of the valve V4. The grid of triode $a$ of valve V6 is connected through a resistance R7 to the sliding arm F of a ranging potential divider P and during this period is at a lower potential than the grid of triode $b$. The two triodes $a$ and $b$ are cathode coupled by a large resistance R8, the potential on the cathode following that of which ever grid is the higher. Thus, initially the triode $b$ half of V6 is conducting and the triode $a$ half is cut off, the potential on the grid of triode $a$ being lower than that of the common cathode. When the time-base sweep begins, the voltage on the grid of triode $b$ falls and the cathode potential follows it downwardly until a point is reached where the triode $a$ half of the valve begins to conduct. A sudden change-over therefore takes place, the triode $a$ half of the valve now conducting whilst the triode $b$ half is cut off, since the potential on the grid of triode $b$ continues to fall although the cathode potential remains at that of the grid of triode $a$. This change-over is made very rapid by coupling the anode of triode $b$ to the grid of triode $a$ through a condenser C8 which in combination with the cathode coupling gives a flip-flop action similar to that of valve V2. A sharp negative-going step is thus generated at the anode of triode $a$ of valve V6, delayed from the beginning of the sweep by an amount depending on the position of the ranging potential divider slider F. The amplitude of the step is constant at all range settings since the current taken by valve V6 is practically independent of the grid voltage at which the change-over occurs, being kept constant by returning the common cathode load to a negative supply voltage and not to earth. The flip-flop action is not reversed until the potential on the grid of triode $b$ again passes through that on the grid of triode $a$ during the time-base fly-back.

The negative step from the anode of triode $a$ of valve V6 is fed through a condenser C9 to the grid of a fast-scan valve V7 which is normally conducting so that its anode potential is fairly low. This valve V7 is driven to cut-off and the anode-earth capacity, which includes any stray capacities in the X2-plate and leads thereto, begins to charge up through an anode load resistance R9. The anode volage then rises rapidly until it is the same as that on the cathode of a clamping diode valve V8 at which point valve V8 conducts and prevents it from rising any further. The sweep-voltage thus generated is applied to the X2-plate of the cathode ray tube D, giving an expanded section of the scan which is substantially linear.

The negative step from valve V6 is also fed to a range-spot gate-generating valve V9. To ensure that the range-spot gate falls in the centre of the expanded section of the scan it is necessary to delay the beginning of the gate and the negative step is therefore fed to an inductance coil L1 in the grid circuit of valve V9 through a delay circuit comprising inductance L2 and condensers C10, C11, and C12. Inductance coil L1 is connected directly to the grid of valve V9 which normally operates at zero grid bias. The negative step causes the oscillatory circuit comprising inductance L1, condensers C10, C11 and C12 and the stray capacities across them to "ring," and would produce a train of oscillations were it not for the damping effect of the grid current in the valve V9. The first half-cycle, which is negative, drives the valve to cut-off, and as soon as the voltage on the grid swings positive during the next half-cycle, grid current passes and the remainder of the oscillations are damped out, and the output at the anode of valve V9 is therefore a short single positive pulse. This pulse constitutes the ranging-spot gating pulse.

For stable operation in the valve V6, the grid of triode $a$ thereof must always be initially at a potential far enough below that of the grid of triode $b$ to bias the triode $a$ half of the valve properly to cut-off, since if it is not and both triode halves of the valve can conduct in the quiescent period, the circuit becomes unstable and a double expanded scan is generated. Part of the residual delay is provided by the voltage drop across the clamping diode V5 which ensures that the grid of triode $b$ of valve V6 is always at a slightly more positive potential than the cathode of valve V5. To take account of differences between individual diodes and the ageing of valves it may sometimes be necessary to introduce an additional voltage between the cathode of valve V5 and the ranging potential divider P.

As stated above in connection with Figure 1, the function of the ranging oscillator is to generate trains of sine waves for accurate ranging purposes and these trains are started by the square switching-pulses generated in the main time-base. The negative switching-pulses derived from the junction point of resistances R1 and R2 in the anode circuit of triode $b$ of valve V2 are fed through a condenser C13 to the grid of a valve V10. In the quiescent condition valve V10 passes a steady standing current through an oscillator coil L3 connected in the anode circuit thereof and the grid leak R10 is returned to the power supply to ensure that the valve always operates at the same point on its characteristic and the standing current is therefore the same. The square negative switching-pulses fed to the grid of valve V10 drive the valve to cut-off. An oscillatory circuit consisting of the coil L3 and condensers C14, C15 and C16 immediately begins to oscillate since the steady current which was previously flowing through L3 is suddenly stopped. The current flowing through the coil L3 just before the switching-pulse is always the same both in direction and amount and the oscillation therefore always starts at the same point in the cycle, namely the cross-over point in the sine wave, and is sinusoidal. In its cut-off condition valve V10 presents a high impedance and therefore has very little damping effect on the oscillation. In the absence of any feed-back the train of sine waves thus generated will be damped by the internal resistance of the coil L3 and the load resistance into which the circuit operates, and to offset this damping sufficient positive feed-back is provided to maintain the oscillation at a constant amplitude once it has started. This is accomplished as follows: Coil L3 is connected by condenser C17 to the grid of a cathode-follower valve V11 which is biased to the linear portion of its characteristic by a high resistance voltage divider R11, R12 connected across the supply voltage. Part of the output from valve V11 is applied to the grid of a feed-back valve V12 through a tapping on a voltage divider R13, R14, forming the cathode load of valve V11, the coupling being effected through a condenser C18. The feed-back valve V12 is connected to an anode load comprising a few turns L4 wound as a secondary to the coil L3 and so connected as to introduce positive feed-back to the oscillatory circuit. Valve V12 is provided with a variable cathode resistance R15 which introduces degeneration and its setting is so adjusted that sufficient feed-back into the oscillatory circuit is obtained to maintain the amplitude of oscillation constant over the duration of the train.

At the end of the negative switching-pulse valve V10 is switched on again and the oscillation is damped out. To complete the damping before the beginning of the next train, feed-back valve V12 must be switched off in the quiescent period and the suppressor grid of valve V12 is therefore negatively biased through a resistance R16 and is switched on in the active period by a positive square pulse derived from the tap on the anode load R3, R4 of triode a of valve V2 referred to above. At the end of the pulse, valve V12 is biased to cut-off and the feed-back is thus removed.

Valve V13 is a cathode-follower which provides a low impedance output for the train of oscillations. A transformer T is connected in the cathode circuit of valve V13 and the output from the secondary winding of the transformer is fed to the phasing network in the ranging unit J.

The ranging unit J comprises a variocoupler used as a phase-shifting transformer. It has been found that the field and search coil assembly of a standard goniometer as normally employed in direction finding is well adapted for use as this variocoupler. The input to the quadrature networks consists of trains of sine waves and the signal is therein divided into two components differing in phase by exactly 90°, the components then being fed to the two field circuits of the variocoupler, the axes of which are physically at right angles to each other. The output from the rotatable coil S of the variocoupler is again a train of sine waves the electrical phase-shift of which, measured in electrical degrees relative to the input, is dependent on the mechanical position of the rotatable coil S measured in mechanical degrees. As shown in the drawing, the centre points of the two field windings F1, F2 of the variocoupler are connected to earth. The windings are mounted on a slotted former and provided with a low-loss iron-dust core. The winding F2 has two equal resistances R17 connected in series therewith and the winding F1 also has two equal resistances R17 and in addition two equal condensers C19 connected in series therewith, these condensers and resistances forming the quadrature networks. In parallel with each of the field windings there is a shunt coil L5, the inductance of which can be varied by means of an adjustable powdered iron core. The two windings F1, F2 and the components in series therewith are fed in parallel from the secondary winding of the transformer T connected in the cathode circuit of valve V13 of the ranging oscillator described above. The rotatable coil S is wound on a separate former which is so mounted that it encloses the field windings and the core and can be rotated about them. The rotatable coil S is preferably mechanically coupled to the sliding arm F of the ranging potential divider P. The output of the coil S is fed through slip-rings to the ranging-spot generator hereinafter described.

In order to obtain the desired accuracy it is essential that the two windings F1, F2 should be physically exactly at right angles to one another and that the fields which they produce should be equal and have a relative electrical phase-displacement of 90°. The first condition is satisfied by the described construction of the variocoupler and the second condition by so selecting the values of the inductance, resistance and capacity of the windings and associated networks as to make the fields equal in strength and the phases of the current flowing through the windings differ by the right amount.

The function of the ranging spot generator, as described in connection with Figure 1, is to convert the train of sine waves from the ranging unit into a number of ranging pips and then to "gate" the one pip which is to be fed to the cathode of the cathode ray tube D in order to produce the ranging-spot.

The output from the rotatable coil S of the ranging variocoupler is fed to the grid of an amplifier valve V14. The cathode bias resistor R18 of this valve V14 is not by-passed so as to improve the linearity of amplification and to prevent distortion. The sine wave output from valve V14 is fed to the grid of a squaring and amplifying valve V15 through a coupling condenser C20. The grid is also connected to earth through resistances R19, R20. The combination of condenser C20 with resistances R19, R20, would normally make the valve V15 act as a leaky-grid detector for small inputs so that the grid would go more and more negative at each negative half-cycle of input voltage until a state was reached such that the grid became positive for only a fraction of the positive half-cycle. The input voltage applied to valve V15 is, however, so large that in the absence of suitable precautions to be described, the anode current would be cut off during most of the cycle and the cross-over point of the anode voltage would not correspond to that of the input voltage at condenser C20. An inverted diode V16 is therefore connected in parallel with resistance R20 so that during positive half-cycles of the output from valve V14 the circuit between condenser C20 and valve V15 in effect consists of resistance R21 in series with the low resistance of the valve V15. During negative half-cycles the same circuit in effect consists of resistance R19 in series with the conducting diode V16. The resistances are so selected that condenser C20 discharges into a similar load during positive and negative half-cycles, and does not become charged, and the grid voltage of V15, and therefore the anode voltage thereof, "crossover" exactly at the same instant as the "crossover" of the sine wave output of V14. The squaring is produced by the sudden start of grid current during positive half-cycles and the cut-off of anode current during negative half-cycles. A resistance R22 forming the anode load of valve V15 is connected in series with a compensating inductance L6 and in order to make sure that the vertical sides of the square-wave output are really steep. Inductance L6 is made rather larger than it would need to be for normal accurate compensation and the valve is therefore over-compensated. The squared signal is then fed through a condenser C21 to a pulse-forming valve VL7, the grid leak R23 of which is connected to the high tension line so that the valve passes a heavy standing current in the quiescent condition. The anode load of valve V17 consists of coil L7 in parallel with a damping diode V18. The negative-going parts of the square-wave drive valve V17 to cut-off, suddenly stopping the current which has been flowing through L7 and making it ring, but only single-positive voltages are produced at the anode since the diode valve V18 damps out the remainder of the trains. Since both the inductance of coil L7 and the stray capacities across it which form the oscillatory circuit are small, the pulses are of extremely short duration and they coincide in time with the negative-going cross-over points of the sine wave input from the variocoupler. The positive ranging-pips so produced are fed to the grid of a gating valve V19 through a condenser C22. The positive ranging-spot gating pulse is fed from valve V9 through a condenser C23 to the screen of valve V19. As this is the only potential supplied to its screen, valve V19 can then only conduct while its screen is driven positive by valve V9, so that the only pip to appear at the anode of valve V19 is the one which reaches the grid during the period of the gating pulse. The grid bias voltage applied to the valve V19 is adjusted by means of a potentiometer R24 so as to bring valve V19 just to cut-off so that application of the gating-pulse does not by itself produce an output at the anode. The output at the anode of valve V19 is thus a single short negative pulse which is the ranging-spot. This single short negative pulse is fed to the cathode of the cathode ray tube D and will brighten the trace. Alternatively, the pulse produced at the anode of valve V19 may be fed to the grid of the cathode ray tube D to overcome momentarily the negative trace-brightening pulse applied to the cathode, and thus remove the trace.

For calibrating purposes a calibrator unit generating a standardized series of pulses may be connected to the grid of valve V1 through a coupling condenser C24 and to the Y-plate of the cathode ray tube.

Figure 3:
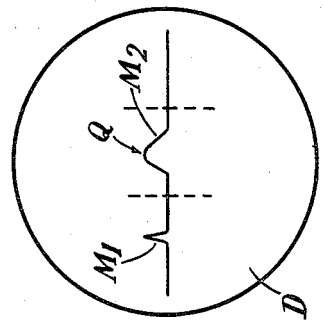
Figure 3 is a representation of the face of the cathode ray tube of Figs. 1 and 2 showing a radar trace according to this invention.
Figure 2:
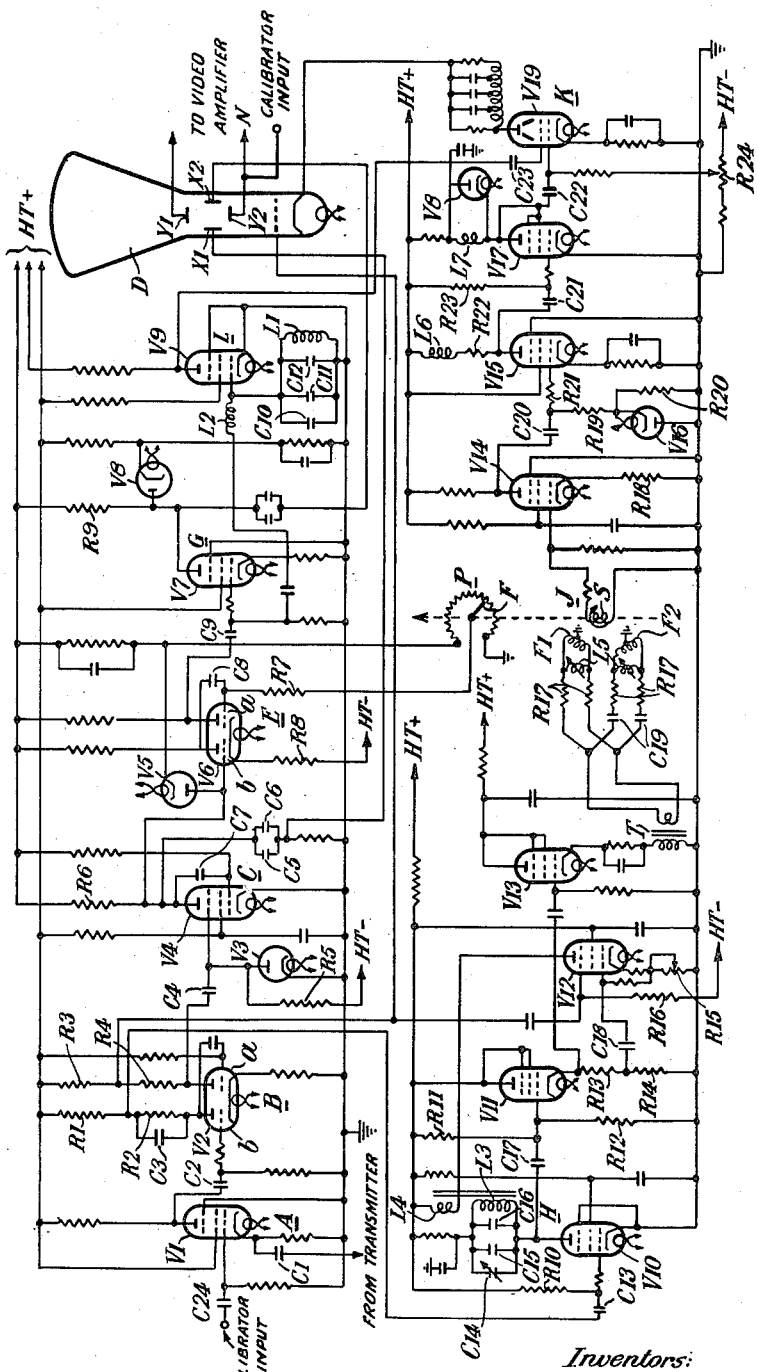
Figure 2 is a detailed circuit diagram of the arrangement shown in Figure 1.

In Fig. 3 is shown a representation of a radar trace according to the invention on the face of the cathode ray tube D of Figs. 1 and 2. Two radar echoes are shown and designated as $M_1$ and $M_2$. Echo $M_2$ is represented as occurring within the expanded portion of the time-sweep trace, bounded by the dashed vertical lines, and the arrow Q points at the portion of the trace which is alternatively brightened or removed according to the invention and corresponds to the selected calibration marker or range spot. Thus when the range spot marks the desired echo as shown, the distance to the echo can be read directly off a calibrated control on the ganged potential divider P and ranging unit J.

It will be appreciated that the invention is applicable to object-locating and -detecting systems in which radiation of electromagnetic waves other than radio-frequency, for example infrared rays, or radiation of sonic or supersonic frequencies are transmitted and the objects are located and detected by the reception of echoes produced by the objects.

Numerous additional applications of the principles above-disclosed in the embodiment shown will occur to those skilled in the art and no attempt has been made to exhaust such possibilities. The scope of this invention is defined in the following claims.

What is claimed is:

1. In apparatus of the class described the combination of a cathode ray tube, a time-sweep circuit therefor, a supplementary circuit for increasing the rate of sweep of a portion of the time-sweep, a calibration marker generator, a control for shifting the calibration markers and the time-sweep relative to one another, and a circuit for modifying the cathode ray tube trace in response to the output of said supplementary circuit and said calibration marker generator whenever said supplementary circuit and said generator produce an output simultaneously.

2. In apparatus of the class described the combination of a cathode ray tube, a time-sweep circuit therefor, a supplementary circuit for increasing the rate of sweep of a portion of the time-sweep, a calibration marker generator, a circuit for modifying the cathode ray tube trace in response to the output of said supplementary circuit and said calibration marker generator whenever said supplementary circuit and said generator produce an output simultaneously, and a control for said supplementary circuit for shifting the increased rate sweep portion and the time-sweep relative to one another.

3. Apparatus according to claim 2 wherein a control is provided for shifting the calibration markers and the time-sweep relative to one another and said shifting control and supplementary circuit control are ganged together for simultaneous operation.

4. Apparatus according to claim 3 wherein said shifting control and supplementary circuit control are simultaneously adjustable by means of a calibrated control.

5. In apparatus of the class described the combination of a cathode ray tube, a time-sweep circuit therefor, a supplementary circuit for increasing the rate of sweep of a portion of the time-sweep, a calibration marker generator, a circuit for modifying the cathode ray tube trace in response to the output of said supplementary circuit and said calibration marker generator whenever said supplementary circuit and said generator produce an output simultaneously, and a cathode-coupled flip-flop circuit controlled by a master-frequency source and connected to said time-sweep circuit to initiate the cathode ray time-sweep.

6. Apparatus according to claim 5 wherein said calibration marker generator comprises a pulsed oscillator circuit for generating a train of sine waves connected to said cathode-coupled flip-flop circuit for triggering thereby and a squaring and peaking circuit for squaring the sine waves and converting the squared waves into a series of positive pips, there being one pip per cycle of the sine wave train.

7. Apparatus according to claim 6 wherein said calibration marker generator includes a phase-shifting transformer having two fixed quadrature primary windings and a secondary winding which is adjustable relative thereto and the train of sine waves from the pulse oscillator circuit is fed to said two primary windings and said secondary winding is connected to the squaring and peaking circuit, whereby the relative phase of a sine wave and is corresponding positive pip may be varied.

8. Apparatus according to claim 7 wherein the adjustable secondary winding of the phase-shifting transformer is calibrated so as to indicate positive pip movement when said secondary winding is adjusted.

9. Apparatus according to claim 8 wherein the phase-shifting transformer comprises the field and search coil assembly of a goniometer such as is employed in direction finding.

10. In apparatus of the class described the combination of a cathode ray tube, a time-sweep circuit therefor, a supplementary circuit for increasing the rate of sweep of a portion of the time-sweep, a calibration marker generator, a circuit for modifying the cathode ray tube trace in response to the output of said supplementary circuit and said calibration marker generator whenever said supplementary circuit and said generator produce an output simultaneously, and a calibrated potential divider having an adjustable tapping and a relay connected between said time-sweep circuit and said supplementary circuit and which is subject to the control of a voltage which is synchronized with the recurrence frequency of the time-sweep circuit and of a voltage which depends on the adjustment of the adjustable tapping on the calibrated potential divider, whereby the increased rate sweep portion of the time-sweep in initiated at a time which is determined by the output from said relay.

11. Apparatus according to claim 10 wherein said relay comprises a valve multivibrator having a common cathode load and including two control grids, said control voltages being applied to said two control grids.

12. Apparatus according to claim 11 wherein said supplementary circuit for increasing the rate of sweep of the cathode ray time-sweep includes a continuously conducting valve which is driven to cut-off when the relay is triggered, thereby starting said increased sweep portion of the cathode ray tube trace for a predetermined period commencing at the instant of operation of the relay.

13. Apparatus according to claim 12 wherein there is a gating valve having a control grid and a screening grid and a gate-generating circuit and the output from the multivibrator relay is also applied to said gate-generating circuit to produce a single positive gating-pulse during the period when the relay remains triggered, and the calibration markers in the form of a series of positive pips are applied to the control grid of said gating-valve to whose screening grid said single positive gating-pulse is applied, whereby only calibration markers reaching the control grid of the gating-valve during the period of the positive gating-pulse produce an output from said gating-valve.

14. Apparatus according to claim 13 wherein the output from said gating-valve is connected to the cathode of said cathode ray tube to brighten thereby the corresponding portion of the cathode ray tube trace.

15. In apparatus of the class described the combination of a cathode ray tube, a time-sweep circuit therefor, a supplementary circuit for increasing the rate of sweep of a portion of the time-sweep, a calibration marker generator, a circuit for modifying the cathode ray tube trace in response to the output of said supplementary circuit and said calibration marker generator whenever said supplementary circuit and said generator produce an output simultaneously, and a receiver modifying the trace of the time-sweep to indicate returned signals and wherein the output of said modifying circuit is applied to the cathode of said cathode ray tube, whereby whenever said calibration marker generator and said supplementary circuit produce an output simultaneously the corresponding portion of the cathode ray tube trace is brightened.

16. In apparatus of the class described the combination of a cathode ray tube, a time-sweep circuit therefor, a supplementary circuit for increasing the rate of sweep of a portion of the time-sweep, a calibration marker generator, a circuit for modifying the cathode ray tube trace in response to the output of said supplementary circuit and said calibration marker generator whenever said supplementary circuit and said generator produce an output simultaneously, and a receiver modifying the trace of the time-sweep to indicate returned signals and wherein the output of said modifying circuit is applied to the grid of said cathode ray tube, whereby whenever said calibration marker generator and said supplementary circuit produce an output simultaneously the corresponding portion of the cathode ray tube trace is reduced in intensity.

17. The combination of a cathode ray tube, a time sweep circuit therefor, a time delay circuit connected to the output of said time sweep circuit to produce an output timed after the beginning of the time sweep input thereof, a supplementary circuit connected between the output of said time delay circuit and said cathode ray tube for increasing the rate of sweep of a portion of the cathode ray tube time sweep at a time determined by the output of said time delay circuit, a calibration marker generator for producing a series of timed calibration markers during the time sweep output of said time sweep circuit, a normally-off gating circuit connected between said calibration marker generator and said cathode ray tube to modify the output of said cathode ray tube trace in response to each calibration marker passed by said gating circuit, and a gate pulse generator connected between said time delay circuit and said gating circuit to gate the latter to pass one calibration marker simultaneously with the occurrence of said increased rate of sweep portion of the cathode ray tube time sweep, thereby to modify the cathode ray tube trace at a point on the expanded sweep portion thereof.

18. Apparatus according to claim 17 including a phase-shifting device for shifting the calibration markers and the time sweep relative to one another.

19. Apparatus according to claim 18 wherein the time delay output of said time delay circuit is variable and a control is provided therefor thereby to shift the increased rate of sweep portion of the cathode ray tube time sweep and said time sweep relative to one another and said phase-shifting device and time delay circuit control are ganged together for simultaneous operation.

20. Apparatus according to claim 19 wherein said phase-shifting device and time delay circuit control are simultaneously adjustable by means of a calibrated control.

21. Apparatus according to claim 17 wherein the time delay output of said time delay circuit is variable and a control is provided therefor thereby to shift the increased rate of sweep portion of the cathode ray tube time sweep and said time sweep relative to one another.

DANIEL STEWART WATSON.
CECIL ALFRED LAWS.

REFERENCES CITED

The following references are of record in the file of this patent:

UNITED STATES PATENTS

| Number | Name | Date |
| --- | --- | --- |
| 2,416,320 | Jeanne | Feb. 25, 1947 |
| 2,419,541 | DeRosa | Apr. 29, 1947 |
| 2,432,196 | Hershberger | Dec. 9, 1947 |
| 2,465,368 | Frink | Mar. 29, 1949 |
| 2,467,208 | Hahn | Apr. 12, 1949 |